United States Patent
Bridier et al.

(10) Patent No.: US 11,136,634 B2
(45) Date of Patent: Oct. 5, 2021

(54) METHOD FOR HEAT TREATING BY INDUCTION AN ALLOY COMPONENT FOR GENERATING MICROSTRUCTURE GRADIENTS AND AN ALLOY COMPONENT HEAT TREATED ACCORDING TO THE METHOD

(71) Applicants: ÉCOLE DE TECHNOLOGIE SUPÉRIEURE, Montreal (CA); INSTITUT SUPERIEUR DE L'AERONAUTIQUE ET DE L'ESPACE—ÉCOLE NATIONALE SUPERIEURE DE MECANIQUE ET D'AEROTECHNIQUE (ISAEENSMA), Futuroscope-Chasseneuil-du-Poitou (FR); Aubert & Duval, Paris (FR)

(72) Inventors: Florent Bridier, Bouaye (FR); Philippe Bocher, Montreal (CA); Jonathan Cormier, Chasseneuil-du-Poitou (FR); Patrick Villechaise, Vouneuil-sous-Biard (FR)

(*) Notice: Subject to any disclaimer, the term of this patent is extended or adjusted under 35 U.S.C. 154(b) by 0 days.

(21) Appl. No.: 16/062,448

(22) PCT Filed: Dec. 21, 2016

(86) PCT No.: PCT/CA2016/051519
§ 371 (c)(1),
(2) Date: Jun. 14, 2018

(87) PCT Pub. No.: WO2017/106970
PCT Pub. Date: Jun. 29, 2017

(65) Prior Publication Data
US 2018/0371564 A1 Dec. 27, 2018

Related U.S. Application Data

(60) Provisional application No. 62/270,783, filed on Dec. 22, 2015.

(51) Int. Cl.
*C21D 1/42* (2006.01)
*C22F 1/00* (2006.01)
(Continued)

(52) U.S. Cl.
CPC ............... *C21D 1/42* (2013.01); *C21D 1/63* (2013.01); *C21D 11/005* (2013.01); *C22F 1/002* (2013.01); *C22F 1/10* (2013.01)

(58) Field of Classification Search
CPC .......... C21D 1/42; C21D 1/63; C21D 11/005; C21F 1/002; C21F 1/10
(Continued)

(56) References Cited

U.S. PATENT DOCUMENTS

| 4,820,358 A | 4/1989 | Chang |
| 5,312,497 A | 5/1994 | Mathey |

(Continued)

FOREIGN PATENT DOCUMENTS

| EP | 0284876 A1 | 10/1988 |
| EP | 2333244 A2 | 6/2011 |

(Continued)

OTHER PUBLICATIONS

Brown et al. "Induction Heating of Billets, Rods and Bars." ASM Handbook, vol. 4C, Induction Heating and Heat Treatment. pp. 330-345. 2014. (Year: 2014).*

(Continued)

Primary Examiner — Brian D Walck
(74) Attorney, Agent, or Firm — Anglehart et al.

(57) ABSTRACT

A superalloy component heat treatment method using controlled induction heat treatment. The method being adapted to controllably generate a coarse grain microstructure region within the component from a fine grain microstructure metallic component. The method further being adapted to controllably form precipitates within the desired region in
(Continued)

order to achieve a desired hardness therein. A single piece alloy component having a controlled core region and a controlled peripheral region. The controlled core region defining fine metallurgical grains and adapted to provide a desired fatigue resistance. The controlled peripheral region defining coarse metallurgical grains and adapted to provide a desired creep resistance.

19 Claims, 14 Drawing Sheets

(51) Int. Cl.
    *C22F 1/10*     (2006.01)
    *C21D 1/63*     (2006.01)
    *C21D 11/00*     (2006.01)

(58) Field of Classification Search
    USPC .......................................................... 148/95
    See application file for complete search history.

(56) References Cited

U.S. PATENT DOCUMENTS

| | | | |
|---|---|---|---|
| 5,527,020 | A | 6/1996 | Ganesh et al. |
| 5,527,402 | A | 6/1996 | Ganesh et al. |
| 6,660,110 | B1 | 12/2003 | Gayda et al. |
| 2004/0069773 | A1* | 4/2004 | Hammond ............... C21D 1/42 219/600 |
| 2011/0123385 | A1* | 5/2011 | Hann .................... C22C 19/056 419/28 |
| 2012/0091122 | A1* | 4/2012 | Ahmad .................. H05B 6/101 219/632 |
| 2015/0129093 | A1 | 5/2015 | Forbes Jones et al. |

FOREIGN PATENT DOCUMENTS

| | | |
|---|---|---|
| EP | 2441849 A2 | 4/2012 |
| WO | 2005/073515 A1 | 8/2005 |
| WO | WO 2005/073515 A1 | 8/2005 |

OTHER PUBLICATIONS

Kristian Berggren et al., Induction Heating: A Guide to the Process and Its Benefits, www.efd-induction.com/~/media/Articles/InductionHeating_July2012.ashx.
PCT/CA2016/051519 IPRP.
PCT/CA2016/051519 ISR.
PCT/CA2016/051519 Search Strategy.
PCT/CA2016/051519 written opinion.
Valery Rudnev et al., Principles of Induction Hardening and Inspection, ASM handbook, 2014, 58-86.
EP16877048 Search Strategy dated Oct. 10, 2019.
EP16877048 supplementary search report dated Oct. 10, 2019.
EP16877048 written opinion dated Oct. 10, 2019.
European application No. 16877048 Communication from the Examining Division dated Jul. 13, 2020.

\* cited by examiner

METHOD FOR HEAT TREATING BY INDUCTION AN ALLOY COMPONENT FOR GENERATING MICROSTRUCTURE GRADIENTS AND AN ALLOY COMPONENT HEAT TREATED ACCORDING TO THE METHOD

CROSS-REFERENCE TO RELATED APPLICATIONS

The present application claims priority of United States Provisional Patent Application No. 62/270,783, filed on Dec. 22, 2015, the contents of which are hereby incorporated.

TECHNICAL FIELD

The present invention relates to the field of alloy heat treatment, and more specifically, to controlled superalloy surface heat treatment in order to develop specific microstructure regions and gradients.

BACKGROUND

A turbine stage of an aeronautic turbomachine operates in a very high temperature environment due to the presence of combustion gases, consequently, components of the turbine stage must have adequate heat resistance properties to operate properly. This is why, various components of the turbine stage are composed of superalloys such as Nickel-base superalloys due to their relatively high resistance to heat. However, it has been observed that components of the turbine stage are exposed to different temperatures. In turbine disks for example during operation, the core region of the disk is exposed to relatively lower temperatures and the peripheral region is exposed to higher temperatures due to its proximity to combustion gases. Therefore, the periphery of the turbine disk must have greater creep resistance (i.e. resistance de melting) then at the core.

It has further been observed that the turbine disk is exposed to different stress levels particularly at its core region in comparison to its peripheral region. After a number of hours of operation including several start and stop cycles, the turbine disk presents a different type of degradation at the core in comparison to the degradation present at the periphery. Indeed, the core region is exposed to greater tractional forces due to the rotational movement of the turbine disk and every start and stop results in fatigue type solicitation. Under repeated use, the core region has a tendency of presenting oligocyclic fatigue or low cycle fatigue (LCF) in addition to some vibrational fatigue. Therefore, the core region must present appropriate tractional force resistance and appropriate low cycle fatigue (LCF) resistance, whereas the peripheral region must present appropriate creep resistance. Unfortunately, the optimum microstructures for both conditions are different and a compromise must be made if a homogeneous microstructure in the manufactured part is required lowering the potential performance of the alloy in both regions. On the other hand, if the concept of microstructure gradient is acceptable, one way of obtaining the proper properties at the right location in a given superalloy component is by heat treating the component and generating a thermal gradient in order to modify microstructural properties of the component by promoting microstructural grain growth where creep resistance is required and microstructurally maintaining a fine metallurgical grain size where tractional force resistance and appropriate LCF resistance are required.

Methods have been developed to generate a thermal gradient by uniformly heating an exterior portion of a piece. One method consists of placing the piece in an oven for a predetermined time while rapidly cooling a core portion of the piece such as with water, air or a heat sink. U.S. Pat. No. 5,527,020 to Ganesh et al. discloses an apparatus and process of heat treating an entire disk to achieve a uniform structure having a fine grain size. The hub is afterwards thermally insulated such that only the rim of the disk is maintained at uniform temperature so as to dissolve precipitates present in the rim and cause grain growth in the rim. The thermally insulated hub is cooled down with a cooling gas such that a temperature gradient is established between the rim and the hub.

U.S. Pat. No. 5,312,497 to Mathey, discloses a method for heat-treating a nickel-base superalloy turbine disk to produce a disk having a fine grain microstructure portion and a coarse grain microstructure portion. An initially fine grain microstructure disk is heated such that a rim portion of the disk is held above a solvus temperature to obtain a coarse grain microstructure. A remainder hub portion of the disk is maintained below the solvus temperature to retain the fine grain microstructure. While heat is applied to the disk, the hub portion is cooled down with a cooling gas that is directed thereto. The coarse grain microstructure provides a reduced fatigue crack growth rate while the fine grain microstructure retains good tensile properties.

Another method consists of submersing the piece into a salt bath that is heated at very high temperatures, after a certain time, the piece is rapidly removed from the salt bath in order to cool down a core portion of the piece such as with water, air or a heat sink.

Dual Structure Turbine Disks Via Partial Immersion Heat Treatment, Superalloys 1988, The Metallurgical Society by J. M. Hyzak, C. A. Macintyre, D. V. Sundber, 1988 discloses a method to produce a dual structure turbine disk forging. A forging is partially immersed in a high temperature (supersolvus) salt bath to a controlled depth. The objective is to coarsen the grain structure in the rim portion of the disk by using a dissolution method while maintaining the as-forged, fine grain size in the bore. High temperature creep and stress rupture properties in the rim section is thereby achieved without degrading strength and low-cycle fatigue properties of the bore.

Still, most commonly, turbine disks are made from superalloys that are uniformly treated, that is, the superalloy material is uniformly treated to present a relatively small, fine grain, or even dual grain sizes (i.e. big grains surrounded by small ones) homogenously distributed throughout the disk. The above mentioned methods to produce a dual structured turbine disk are not easily reproducible and a specific desired result may not be easily produced. Moreover, the oven or the salt bath that is heated at very high temperatures can expose an operator to severe burning injuries particularly when the piece must be rapidly removed from the heat in order to cooled down.

Turbine disks that are made from superalloys are uniformly treated to present a relatively small or fine grain throughout the disk providing good tractional and LCF resistance but relatively low creep resistance and crack propagation resistance. Some forging processes can also generate dual microstructures (i.e. large grains surrounded by small grains) which is often a poor compromise between the two microstructures, however, these forging processes are complex and expensive to carry out. To avoid disc failure by fatigue, such turbine disks are designed to achieve acceptable properties at its core but weak properties at its periphery, imposing lower operating temperature and fuel efficiency ratio. However, engine manufacturers have as an objective to increase combustion gas temperatures of turbomachinery in order to achieve increased efficiency. At present, such increase in combustion gas temperature is not possible, partially due to the low creep and crack propagation resistances at the periphery of most common turbine disks.

It has further been observed that the above mentioned methods do not allow to rapidly cool or quench the outside layer of a part in a controlled manner and prevent a controlled and homogenous formation of precipitates in the peripheral region of the part even after a precipitation hardening treatment. Indeed, a controlled and homogenous formation of precipitates in the peripheral region of the part is desirable since, if properly configured, precipitates have the ability to block dislocation motion and provide an increased strength to the material. Precipitation hardening, also known as age hardening, is a heat treatment technique used to increase the yield strength of alloy materials. The above mentioned methods do not ensure that a part can be produced with an homogenously distributed high yield strength even after a proper precipitation hardening treatment.

Therefore, there is a need for a reproducible and safe method of heat treating a single piece component allowing rapid cooling down to present good operational properties at its core as well at its periphery even when exposed to high combustion temperatures.

SUMMARY

A grain coarsening treatment method for treating an alloy component having a fine metallurgical grain microstructure. The alloy component has a peripheral region and a core region. The method includes generating a magnetic field around the alloy component with a field inductor connected to an electrical power source in order to induce an Eddy current and dissipate heat by joule effect within the alloy component. The method further includes controlling the electrical power source in order to promote microstructural growth of metallurgical grains at the peripheral region and maintaining the fine metallurgical grain at the core region. The method also includes controlling a cooling temperature gradient in order to generate coarse metallurgical grains and prevent precipitation of a solute element at the peripheral region of the alloy component.

A precipitation hardening treatment method for treating an alloy component having a peripheral region and a core region. The alloy component is composed of a fine metallurgical grain microstructure at the core region and a coarse metallurgical grain microstructure at the periphery region. The method includes generating a magnetic field around the alloy component with a field inductor connected to an electrical power source in order to induce an Eddy current and dissipate heat by joule effect within the alloy component. The method further includes controlling the electrical power source, in order to harden the peripheral region by precipitation while maintaining the coarse metallurgical grain microstructure at the peripheral region and maintaining the fine metallurgical grain at the core region.

A single piece alloy component having a controlled core region and a controlled peripheral region. The controlled core region defining fine metallurgical grains and adapted to provide a desired fatigue resistance. The controlled peripheral region defining coarse metallurgical grains and adapted to provide a desired creep resistance.

A method of manufacturing a part or a machine part that has an alloy component. The method includes forging, casting or producing an untreated alloy to provide an alloy component having a fine microstructural grain. Then treating the alloy component by at least one of the methods described above, to provide a desired resistance at the peripheral region and another desired resistance at the core region. The desired resistance at the peripheral region can include creep resistance, corrosion resistance, crack formation resistance, crack propagation resistance, etc. The desired resistance at the core region can include vibration fatigue resistance such as tractional resistance, oligocyclic fatigue resistance or low cycle fatigue (LCF) resistance.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
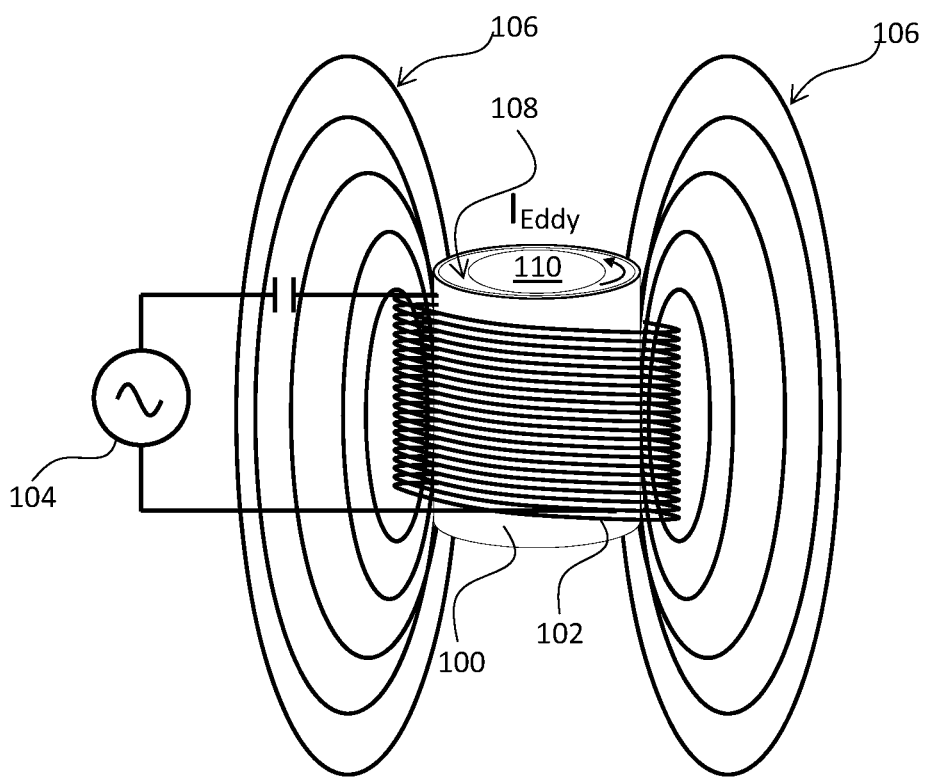
FIG. 1 illustrates a superalloy component that is surrounded by an induction coil connected to an electrical power source in order to generate a magnetic field around the superalloy component to induce an Eddy current and dissipate heat by joule effect within the alloy component, according to one embodiment.

Presented in FIG. 1 is a superalloy component 100 that is surrounded by an induction coil 102 connected to an electrical power source 104, according to one embodiment. The superalloy component 100 is generally produced by forging, casting or by a powder metallurgy process providing a uniform fine grain microstructure. Under power, according to the Lenz-Faraday law, the induction coil 102 generates a magnetic field 106 around or in proximity to the superalloy component 100 and Eddy currents are thereby induced within the component 100. The Eddy current dissipates heat by joule effect within the component 100. Since the induced Eddy current is stronger at a peripheral region 108 than at a core region 110 of the component 100, the local amount of dissipated heat is greater at the peripheral region 108 than at the core region 110.

In FIG. 1, the superalloy component 100 is surrounded by the induction coil 102 in order to provide a uniform electromagnetic field 106 around the external surface of the superalloy component 100. However, a skilled person will understand that depending on the size, shape or form of the superalloy component 100, the induction coil 102 may be placed in proximity with the component 100 without necessarily surrounding the component 100 and still provide sufficient exposure to the electromagnetic field 106.

The component 100 can be made from any type of alloy, however in aeronautical applications components made from a superalloy material is preferred due to their mechanical strength and resistance to high temperatures. Indeed, superalloys are commonly used in various parts of gas turbine engines that are subject to high temperatures and require high strength, high temperature creep resistance, and oxidation or corrosion resistance. In the following, a treatment of a nickel-base superalloy component 100 is described, however a skilled person will understand that other types of superalloys (ex.: cobalt-base, nickel-iron-base) or alloy (ex. stainless steel) may also be treated accordingly depending on the area of application, without departing from the present scope. Moreover, in the following the nickel-base superalloy component 100 has a disk shape for being used in a turbine, however depending on the area of application, the component 100 can have any other suitable regular or irregular shape, form and size.

Figure 2:
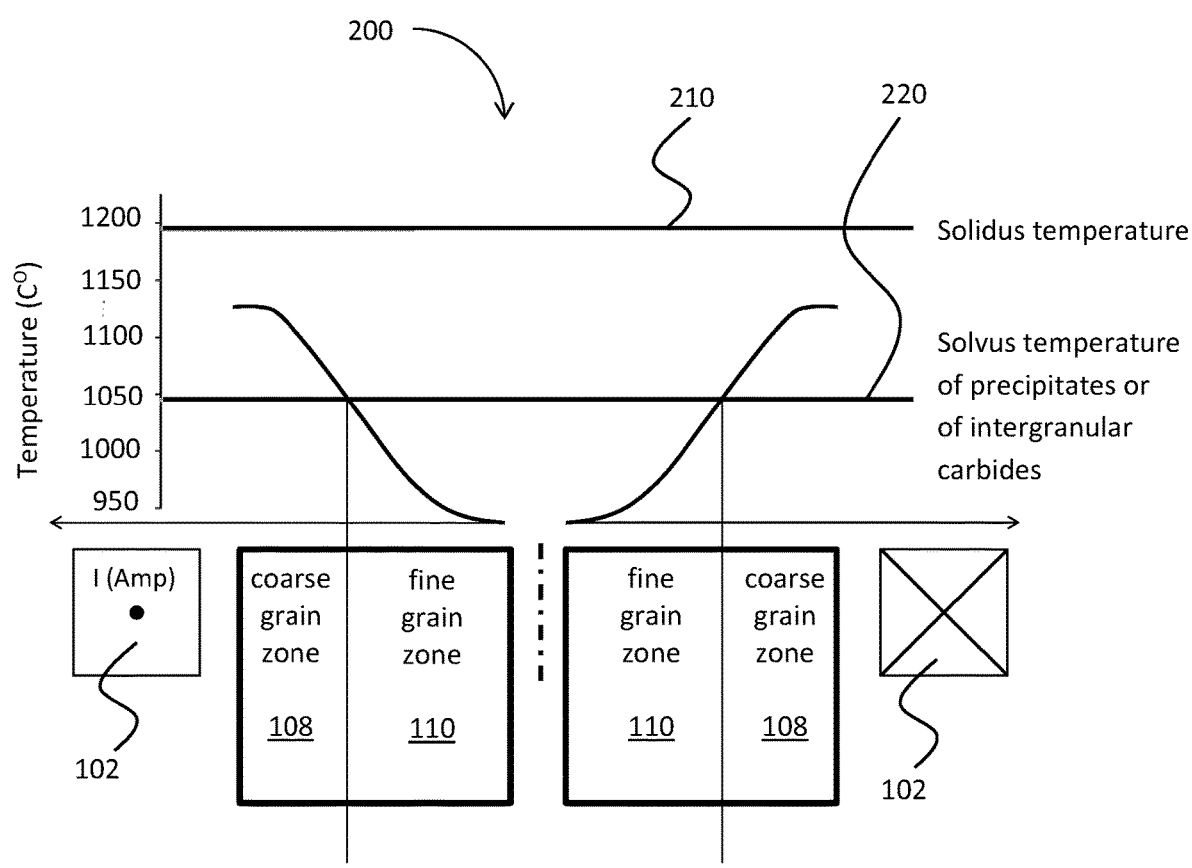
FIG. 2 illustrates a graph indicating a hypothetical solidus temperature threshold and a hypothetical solvus temperature of precipitates threshold in association with a coarse grain zone cross-section and fine grain zone cross-section of the superalloy component of FIG. 1, according to one embodiment.

According to one embodiment, there is produced a nickel-base superalloy disk component 100 having a gradient microstructure between the periphery 108 and the core 110. FIG. 2 presents a schematic cross-sectional view of the nickel-base superalloy disk component 100, the periphery 108 has a coarse grain microstructure (i.e. large grain microstructure) and the core 110 has a fine grain microstructure (i.e. small grain microstructure). A transition region exist between the periphery 108 and the core 110 but it is now shown in the drawing even if the control of the transition region can be of importance for real applications and the optimization of the manufactured part. Depending on the area of application, the coarse grain microstructure provides for greater creep resistance whereas the fine grain microstructure provides for greater vibration fatigue resistance (i.e. tractional resistance, oligocyclic fatigue resistance or low cycle fatigue (LCF) resistance). In materials science, creep is the tendency of a solid material to deform permanently under the influence of a constant mechanical stress. Creep can occur as a result of long-term exposure to high levels of stress that are still below the yield strength of the material. Note that creep is more severe in materials that are subjected to high temperatures and for long periods of exposure, and generally increases as they near their melting point. Larger grain size reduces the creep activity. On the other hand, fatigue is the irreversible change of a material caused by variations of applied loads. It is a progressive and localized structural damage process that occurs when a material is subjected to stress fluctuations with time. If the loads are above a certain threshold, microscopic cracks will begin to form at macroscopic stress concentrators, local stress raisers such as at grain boundaries, in specific crystal orientation, or induced by the environment. Eventually a crack will reach a critical size and propagate until the structure fractures. Therefore, in order to overcome fatigue a fine grain microstructure is desirable since formation of such microscopic cracks are pushed to higher stress levels when the size of the grain decreases.

In the following description, the coarse grain microstructure is generated in order to provide a desired creep resistance, at the periphery region 108. However, it shall be understood that in other areas of application, the coarse grain microstructure at the periphery region 108 may be desirable for providing other types of resistive properties such as, corrosion resistance, crack formation resistance, crack propagation resistance, etc. or any combination thereof.

Further presented in FIG. 2 is a graph 200 indicating a solidus temperature threshold 210 and a solvus temperature of precipitates 220. When the nickel-base superalloy 100 is exposed to temperatures below the solidus threshold 210, the superalloy remains completely solid but the size of its grain structure can change. When the nickel-base superalloy 100 is exposed to temperatures between the solidus threshold 210 and the solvus threshold 220 for a sufficient period of time, some precipitates, in particular intergranular carbides, may dissolve in the superalloy 100. Following the dissolution of the precipitates the grain size increases to form a coarse grain zone in the peripheral region 108. If the superalloy is rapidly cooled down after the induction heat treatment, dissolution of the precipitates can be controlled and limited in order to generated a desired coarse grain size in the peripheral region 108. When the nickel-base superalloy 100 is exposed to temperatures below the solvus threshold 220, the grain size of the superalloy 100 remains unchanged and the fine grain zone 110 is thereby maintained.

Figure 3:
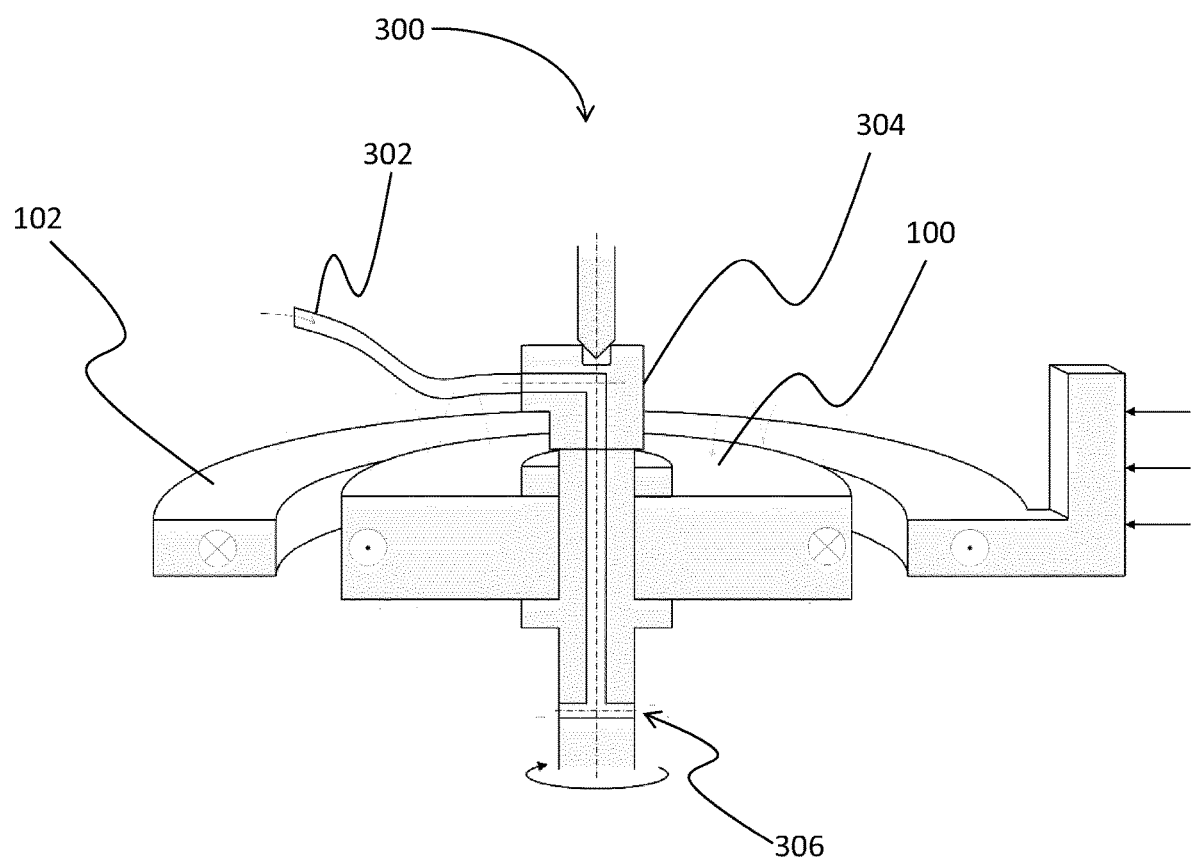
FIG. 3 illustrates a superalloy component mounted to an induction heating and cooling assembly having a field inductor and a water cooling system, according to one embodiment.

According to one embodiment, a turbine disk 100 having a fine grain microstructure and providing optimum fatigue resistance properties is placed within an alternating electromagnetic field 106, as presented in FIG. 1 and concurrently presented in FIG. 3. A temperature gradient is produced by the induced Eddy current within the turbine disk 100 from the periphery region 108 to the core region 110. During a predetermined period of time, the periphery region 108 is brought to a temperature that is above the solvus threshold 220 while still remaining below the solidus threshold 210, in order to promote the dissolution of precipitates and increase grain size for providing a desired creep resistance. The core region 110 remains below the solvus threshold 220 and the fine grain microstructure remains unaltered in order to still provide optimum fatigue resistance properties. However, the generation of the electromagnetic field 106 must be controlled according to the geometry, the magnetic, electric and thermic properties of the alloy constituting the component 100, According to one embodiment, the current and power provided by the generator 104 are controlled. The greater the current the greater the power generated in the part 100 and the more heat input is provided per unit of time. In addition, the applied frequency is controlled since the choice of the frequency affects the penetration depth of the power distribution introduced in the part. The generated power varies exponentially decreasingly from the surface portion to the internal portion (i.e. the generated power being greater at the surface portion then at the internal portion), and the efficient depth increases as a function of the inverse square root of the frequency applied. Also, thermal diffusivity contributes to the temperature distribution and the related grain coarsening. Consequently, in order to reach a desired stable thermal gradient, a treatment duration must be established according to the shape, volume and size of the part 100 while taking into consideration the applied current and frequency.

Moreover, the duration of the treatment is established according to the composition properties of the part 100 and the required temperature to be reached at a targeted area of the part 100 in order to produce coarse grains at the periphery region 108. According to one embodiment, the duration of the treatment is established according to the kinetics of thermal gradient building up and the kinetics of grain size coarsening of the part 100. The kinetics of grain coarsening and the achieved grain size is influenced by the achieved temperature in the targeted area but also by the exposure duration. Therefore, similar results in term of grain sizes can be achieved with higher temperatures but for a shorter exposure duration. During production, a compromise is established between realistic production durations and the capability of controlling the treatment process while still ensuring reproducibility and preventing crack formation during heating or cooling down of the part 100.

During the induction heat treatment, according to yet another embodiment, a rotational force is applied to the component 100, in order to provide a desired heat dissipation by convection and homogeneous exposure to magnetic field. The rotational speed applied to the component 100 generates a controlled fluid movement on the component surfaces 100 in order to influence the thermal exchange. Note that depending on the ambient environment, the controlled fluid movement can be air or any other type of fluid including but not limited to a gas, a liquid, a polymer mixture, a solid body, a vacuum, or any combination thereof. The greater the rotational force applied to the component 100 the greater the provided convection heat dissipation at a targeted area. By controlling the heat dissipation at the targeted area, a desired temperature is controllably reached and maintained. As in any induction heating process, the surface portion of the part 100 is exposed to convection heat dissipation and thermal differences could occur between the internal portion of the part 100 and the surface portion. According to one embodiment, heat lost is compensated by an inductor coil 102 design that is adapted to ensure a homogeneous thermal profile along the height of the part.

According to yet another embodiment, the induction coil 102 is mobile and is adapted to move along the part 100 or along a portion of the part 100, in order to ensure a desired temperature profile or for other practical reasons. Depending on the geometry of the part 100, the mobile coil 102 is adapted to move at variable speeds and also to make a full stop for a given period of time in order to achieve a desired grain coarsening effect. The mobile coil 102 could move, stop and move again if some regions of the part 100 need to be heated for a longer period of time in order to achieve a desired grain coarsening effect. Significant geometry changes (in particular part edges or sides) in the part 102 can require a greater complexity in speed programming of the coil 102 along a defined path.

In an alternate embodiment, the part 100 is mobile and the coil 102 is stationary. The part 100 is adapted to be displaceably introduced, at least in part, into an opening formed by the coil 102. The mobile part 100 is adapted to move at variable speeds and also to make a full stop for a given period of time within the coil 102 in order to achieve a desired grain coarsening effect.

According to another embodiment, the distance between the field inductor 102 and the component 100 is controlled, in fact the size, shape and location of the field inductor 102 with respect to the component is controlled. In particular, the location, size, shape or thickness of the inductor 102 is determined according to the geometry of the part 102 in order to provide a homogenous treatment thereto. The distance between the field inductor 102 and the component 100 affects the level of temperature gradient generated within the component 100 (i.e. treatment depth) and the energetic efficiency of the process. The greater the distance between the induction coil 102 and the component 100, the lesser the peripheral layers of the component will be placed within a heterogeneous magnetic flux, the greater the treatment depth for producing coarse grains, but the lesser efficient the heat treatment will be in term of energy.

According to yet another embodiment, the source frequency provided by the generator 104 is controlled since it affects the induced Eddy current within the component 100. In fact, an increase of the source frequency provided by the generator 104 increases the concentration of induced Eddy current at a surface of the component 100. A decrease of the source frequency provided by the generator 104 provides greater penetration of the induced Eddy currents towards the core of the component 100. Therefore, the source Frequency influences the penetration level of the induced Eddy currents within the component 100 and should be properly chosen. For some complex geometries such as the one presented in FIG. 7 simultaneous dual frequency induction heat treatments can be applied in order to provide a proper microstructure within the component 100. A skilled person will understand that for other complex geometries a greater number of source frequencies can be provided by the generator 104 simultaneously, without departing from the scope of the present method.

The present method of heating the superalloy component 100 by inducing Eddy currents allows to produce heat treatment at very high temperatures within the component with great flexibility in terms of targeted temperatures and microstructure gradients to be obtained. It is independent of the generated temperature level. Moreover, the present method allows to rapidly obtain the desired temperature level as well as to quench (i.e. cool down rapidly) the heated component 100. Also, the present method allows to controllably heat components 100 of complex geometry by varying the source frequency and the size, shape or form of the field inductor 102. Moreover, the present method allows access to the part 100 that is being treated and recording of temperature is possible with a pyrometer or a thermal camera, in order to collect data. Therefore, the present method is precise, controllable, repeatable and recordable.

FIG. 3 presents, according to one embodiment, a side view of an induction heating and cooling assembly 300 to which is mounted the component 100 to be treated. The assembly 300 is connected to a water supply hose 302 in order to provide cold water to a cooling shaft 304 such as a stainless steel shaft 304 and to conduct water to sprays 306 for an eventual final quenching. The field inductor 102 is positioned at a bottom portion of the assembly 300 and is connected to a power generator (not shown).

A skilled person will understand that any other appropriate type of cooling assembly can be used in order to provide a required cooling or quenching rate of the component 100.

Figure 4:
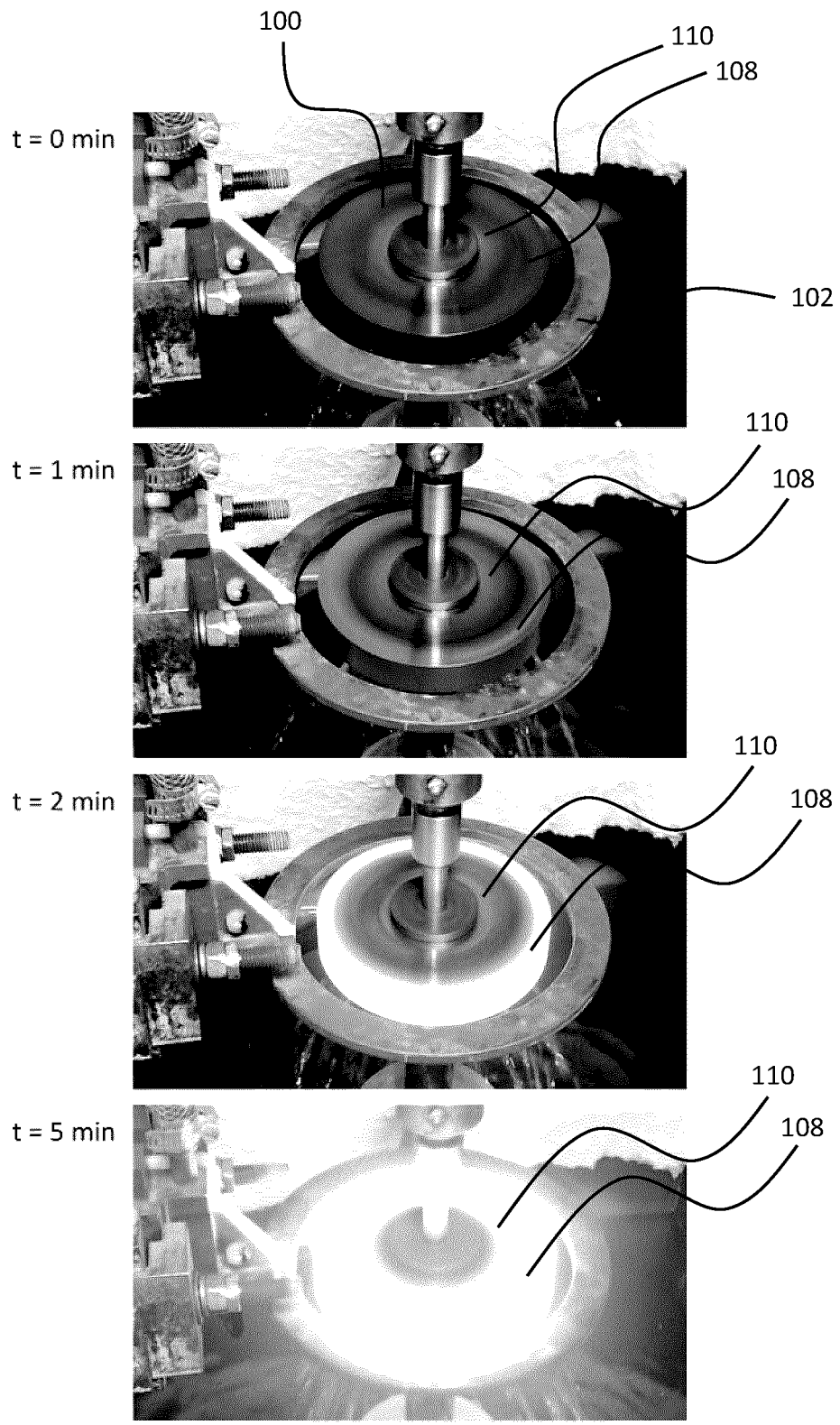
FIG. 4 illustrates the assembly of FIG. 3 at different operation time periods, an Eddy current is induced and heat dissipation by joule effect from a periphery of the component toward a core of the component is visible, according to one embodiment.

FIG. 4 presents, superior side views of the induction heating and cooling assembly 300 in operation, as the mounted component 100 is being heat treated, according to one embodiment. In this case, the mounted component 100 has a diameter of 126 mm and a selected constant power at a frequency of 10 kHz is applied to the coil 102 by the generator 104. At one minute, the component 100 that had initially a dark periphery 108 presents a reddish heated periphery 108, the core 110 remains unchanged. At two minutes, the reddish heated periphery 108 has increased in temperature and glows a white light, the core 110 still remains unchanged. At five minutes, the whole component 100 glows a white light and a desirable heat penetration level has been reached. In fact, this heat treatment process takes about 10 minutes to reach a steady state condition that reaches the desired heat penetration level. At that point, the heating temperature is maintained for a required period of time in order to promote a desired level of grain growth (here 15 minutes). Then the heated regions could be force cooled or quenched using air, forced air, water with polymers or plain water. The force cooling or quenching allows to control the final precipitation state of the produced component 100. In this embodiment, the generator 104 (not shown) feeding the field inductor 102 is a bi-frequency induction generator produced by EFD Induction Group, this generator 104 is adapted to provide frequencies in the range of 10 to 250 kHz and adapted to be driven by constant current or constant power.

A skilled person will understand that any other appropriate type of induction generator 104 can be used in order to feed the field inductor 102 for it to generate the required magnetic field 106 to controllably heat the component 100.

The heat treatment cycle applied can be continuous by generating a continuous electromagnetic field as with the induction generator 104 of FIG. 4. The heat treatment cycle applied can also be cyclic by generating a sequential electromagnetic field during the continuous treatment. This way, the periphery of the component 100 heats up slowly until a thermal equilibrium is achieved between the induction heat and the loss of heat by conduction, convection, and radiation. The cyclic treatment uses alternating heat time and cooling time allowing the heat to propagate or diffuse within the component 100. In this case, the stability of the temperature gradient within the component 100 is determined by the equilibrium between the heating and the cooling periods. Moreover, irrespective of the type of heat treatment cycle (i.e. continuous or cyclic) applied, a rotational speed of the component 100 is also controlled to ensure a homogeneity of the magnetic field around the component and influence the quantity of heat that is dissipated by convection during the heat treatment. Rotation speed from 30 turns per minute to 300 turns per minute were tested but lower or higher values can be used as well, depending on the desired result.

Following the heating, a cooling of the component 100 is performed. The cooling of the component 100 can be safely performed while remaining mounted to the assembly 300. Depending on a desired cooling rate, the component 100 can be cooled down or quenched according to various techniques. According to one cooling technique, the component 100 is quenched by being dipped into a basin or shower of cold water 306, as presented in FIG. 3. The component 100 can also be quenched with any other suitable type of fluid solution, such as a mix of water and a polymer. According to another cooling technique, the component 100 is quenched by exposure to forced air jets composed of any suitable type of gas. According to yet another cooling technique, the component 100 is naturally cooled down by exposure to ambient air. In one case, the component 100 is cooled down by exposure to ambient air or any other appropriate type of ambient fluid while maintaining a rotation of the component 100 as provided by the assembly 300.

Figure 5A:
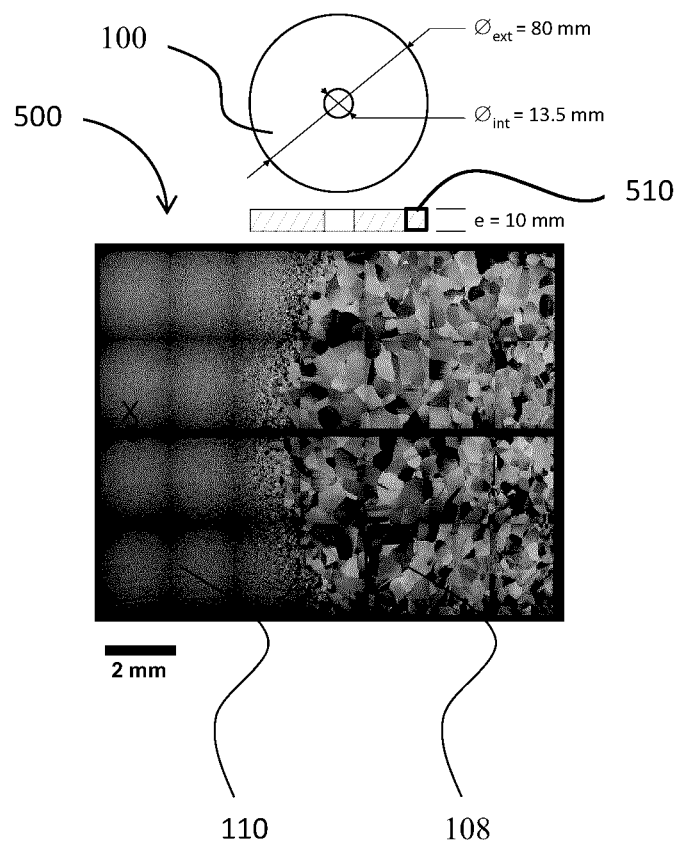
FIG. 5a illustrates an enlarged view of a cross-section of the superalloy component of FIG. 3, after treatment, a coarse grain metallurgical microstructure is visible at a peripheral region and a fine grain metallurgical microstructure is visible at a core region of the superalloy component, according to one embodiment.

Once cooled down and as presented in FIG. 5a, the processed component 100 is composed of various regions each having a particular range of grain sizes and precipitate states (i.e. solid state or dissolved state). The regions having been exposed to low temperatures (typically below 650° C.), such as the core region 110, will not have been affected by the induction heating process and will have maintained the initial properties of the alloy in terms of grain size and precipitate state in order to obtain a desired fatigue resistance. On the other hand, the regions having been exposed to high temperatures (typically between 1050° C. and 1200° C.), such as the peripheral region 108, will have developed large grains and eliminated precipitates or dissolved precipitates and if the cooling speed (i.e. cooling rate) is not adequate or fast enough, some precipitates may uncontrollably reform in a non-uniform arrangement at the peripheral region 108. The uncontrollable and non-uniform formation of precipitates within the peripheral region 108 can prevent adequate control of the mechanical properties, such as material strength properties of the peripheral region 108. In order to have a desired control of the final microstructure in the region 108, the cooling rate should be high enough to maintain the precipitate elements in solid solution. This way, the component 100 can undergo afterwards a controlled precipitation hardening treatment to obtain a controlled and desired mechanical properties in the periphery region 108 without compromising the mechanical properties of the core region 110.

Figure 5B:
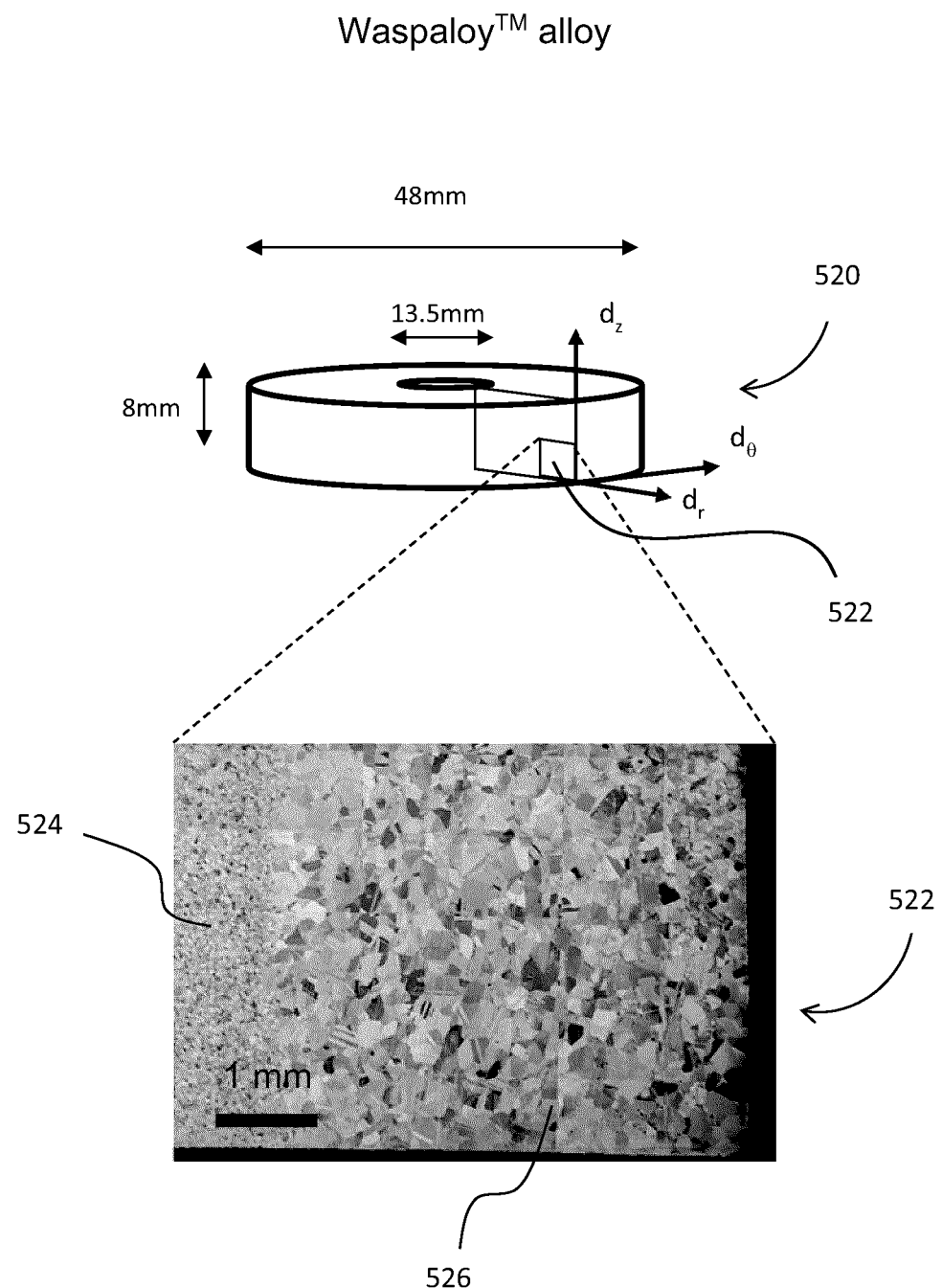
FIG. 5b illustrates an enlarged view of a cross-section of a Waspaloy™ superalloy component, after treatment, a coarse grain metallurgical microstructure is visible at a peripheral region and a fine grain metallurgical microstructure is visible at a core region of the superalloy component, according to one embodiment.
Figure 5C:
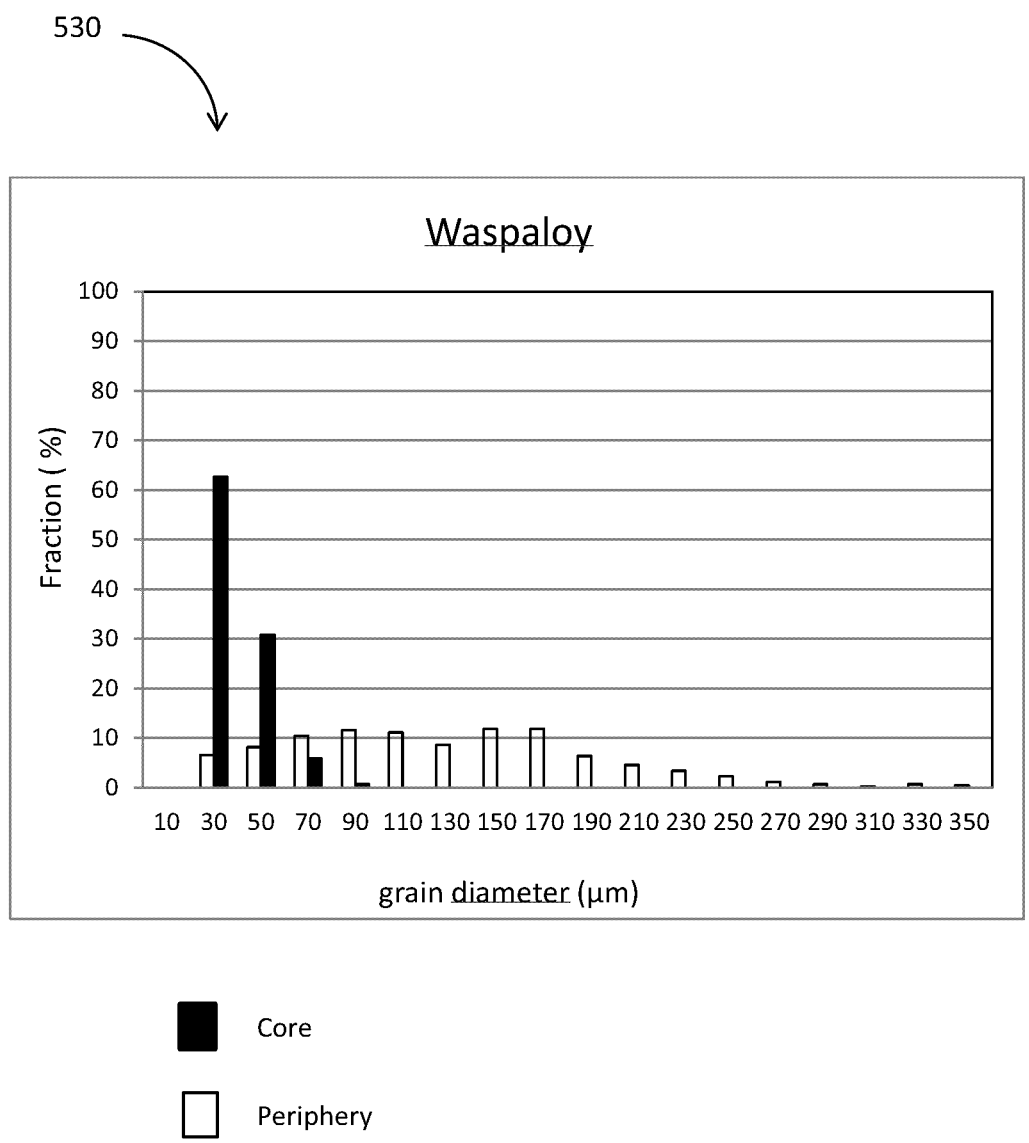
FIG. 5c illustrates a chart representing proportions of grain diameter sizes depending on a core region (in black) or a peripheral region (in white) of the Waspaloy™ superalloy component of FIG. 5b.

According to one embodiment, as presented in FIG. 5b, a Waspaloy™ alloy component 520 has been treated with the induction heating process. In an expanded microscopic view of an outer ring portion 522 of the component 520, a high concentration of unaltered fine grain is present at the core region 524 and a high concentration of coarse grain is present at the periphery region 526. As indicated by graph 530 of FIG. 5c, the core region 524 has essentially grains having a grain size of about 20 µm (see bars in black) and the periphery region 526 has essentially grains having a grain size of about 130 μm (see bars in white). The component 520 is a cylindrical shaped component having an internal diameter measuring thirteen and a half millimeters (13.5 mm), an external diameter measuring forty-eight millimeters (48 mm) and a height measuring eight millimeters (8 mm). According to one method, the component 520 is obtained by applying the induction heating process with the induction coil 102 having an external diameter measuring eighty-three millimeters (83 mm) and a height measuring eight millimeters (8 mm), as concurrently presented in FIG. 1. As it is being heat treated, the component 520 is rotated at a rotational speed of three-hundred turns per minute (300 turns/min). Moreover, as it is being heat treated, the central region of the disk 524 is cooled by a fluid mixture composed of ninety percent (90%) water and ten percent (10%) polymer to protect the machine axes from excessive heating. The heat treatment process is executed using various induction powers for a predetermined amount of time. According to one method, during a first period of half a second (0.5 s), there is applied to the induction coil 102 two (2) cycles at thirteen percent (13%) of a power generated by a power generator adapted to generate one-hundred ten kilo watts (110 kW) followed by period of one and half second (1.5 s) during which there is no power applied to the induction coil 102 allowing heat diffusion through the component 520. During a second period of seven tenth of a second (0.7 s), there is applied to the induction coil 102 two-hundred and ten (210) cycles at six percent (6%) of a power generated by a power generator adapted to generate fifty-two kilo watts (52 kW) followed by a period of two and three tenth of a second (2.3 s) there is no power applied to the induction coil 102 while still allowing heat diffusion through the component 520. Following this heat and diffusion period, a quenching period is applied and the component 520 is sprayed with a fluid mixture composed of ninety percent (90%) water and ten percent (10%) polymer.

Figure 5D:
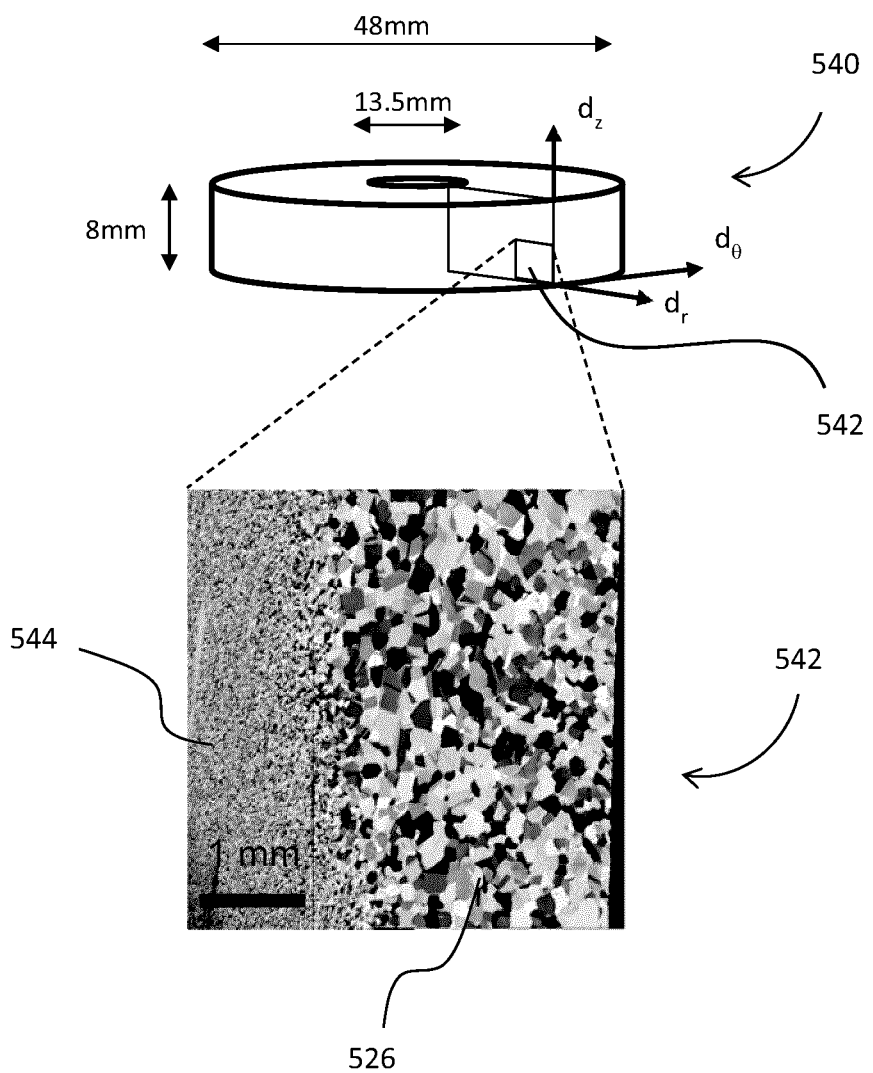
FIG. 5d illustrates an enlarged view of a cross-section of a Udimet720Li™ superalloy component, after treatment, a coarse grain metallurgical microstructure is visible at a peripheral region and a fine grain metallurgical microstructure is visible at a core region of the superalloy component, according to one embodiment.
Figure 5E:
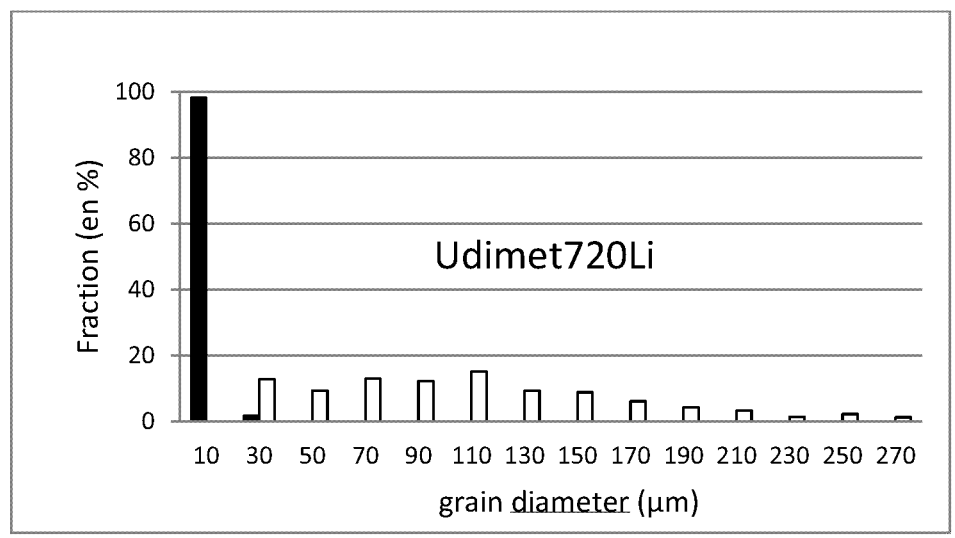
FIG. 5e illustrates a chart representing proportions of grain diameter sizes depending on a core region (in black) or a peripheral region (in white) of the Udimet720Li™ superalloy component of FIG. 5d.

According to another embodiment, as presented in FIG. 5d, a Udimet™720Li alloy component 540 has been treated with the induction heating process. In an expanded microscopic view of an outer ring portion 542 of the component 540, a high concentration of unaltered fine grain is present at the core region 544 and a high concentration of coarse grain is present at the periphery region 546. As indicated by graph 550 of FIG. 5e, the core region 544 has essentially grains having a grain size of about 10 μm (see bars in black) and the periphery region 546 has essentially grains having a grain size of about 120 μm (see bars in white). The component 540 is a cylindrical shaped component having an internal diameter measuring thirteen and a half millimeters (13.5 mm), an external diameter measuring forty-eight millimeters (48 mm) and a height measuring eight millimeters (8 mm). In this instance, the component 540 is obtained by applying the induction heating process with the induction coil 102 having an external diameter measuring eighty-three millimeters (83 mm) and a height measuring eight millimeters (8 mm) as concurrently presented in FIG. 1. As it is being heat treated, the component 540 is rotated at a rotational speed of three-hundred turns per minute (300 turns/min). Moreover, as it is being heat treated, the central region of the disc region 544 is cooled by a fluid mixture composed of ninety percent (90%) water and ten percent (10%) polymer to protect the machine axes from excessive heating. The heat treatment process is executed using various induction powers for a predetermined amount of time. According to one method, during a first period of half a second (0.5 s), there is applied to the induction coil 102 two (2) cycles at twelve percent (12%) of a power generated by a power generator adapted to generate one-hundred kilo watts (100 kW) followed by a period of one and half second (1.5 s) during which there is no power applied to the induction coil 102 allowing heat diffusion through the component 520. During a second period of seven tenth of a second (0.7 s), there is applied to the induction coil 102 three-hundred (300) cycles at five and a half percent (5.5%) of a power generated by a power generator adapted to generate forty-eight kilo watts (48 kW) followed by a period of two and three tenth of a second (2.3 s) there is no power applied to the induction coil 102 while still allowing heat diffusion through the component 540. During a quenching period, the component 540 is sprayed with room temperature air.

Precipitation Hardening Treatment

Precipitation hardening, also known as age hardening is a heat treatment technique used to increase the yield strength of malleable alloy materials. The precipitation hardening treatment involves heat treating the component 100 in order to form precipitates within the component. If properly controlled, the formed precipitates will be configured to allow a hardening of the alloy material according to a desired hardness. Indeed, the formed precipitate particles act as obstacles to dislocation movement and thereby strengthen the material of the component 100.

According to one aspect, the component 100 could be heat treated for controllably forming precipitates by undergoing a second induction heat treatment or any other adequate type of heat treatment process. However in some cases, the desired precipitate state of the peripheral region 108 may not be the same as in the core region 110, the core region 110 needing to be fatigue resistant whereas the peripheral region 108 needing to be creep resistant. The precipitation hardening treatment for the peripheral region 108 is set after the grain coarsening treatment (i.e first induction heat treatment) at a combination of temperatures and durations that are low enough to improve the time dependent mechanical properties (creep and dwell-crack propagation resistances) while keeping the optimized microstructure for the core region 110. Alternatively, the additional (low temperature) heat treatment is applied to the whole component 100 in order to influence the precipitation state of the peripheral region 108 (grain coarsened region).

It shall be understood that the precipitation hardening treatment can use the same induction heating process as the grain coarsening treatment but at lower temperatures and, if required, during a longer period of time. In fact, the two treatments (i.e. grain coarsening treatment and precipitation hardening treatment) may be sequentially performed without having to undergo a complete cooling of the component 100.

It shall further be understood that the precipitation hardening treatment described above may be performed independently from the grain coarsening treatment. In addition, any other method of grain coarsening treatment may be performed before performing the precipitation hardening treatment described above.

FIG. 5a illustrates an induction heating result of an Udimet™ 720i disk component 100 having an 80 mm diameter and a 10 mm height by presenting a change in a microstructural composition 500 with the help of an expanded microscopic view of an outer 10 mm ring portion 510 of the disk component 100. The microstructural composition 500 of the disk component 100 presents a coarse grain at the periphery region 108 in order to provide an adequate creep resistance. The microstructural composition 500 of the disk component 100 further presents an unaltered fine grain at the core region 110 in order to provide an adequate vibration-fatigue resistance.

Figure 6:
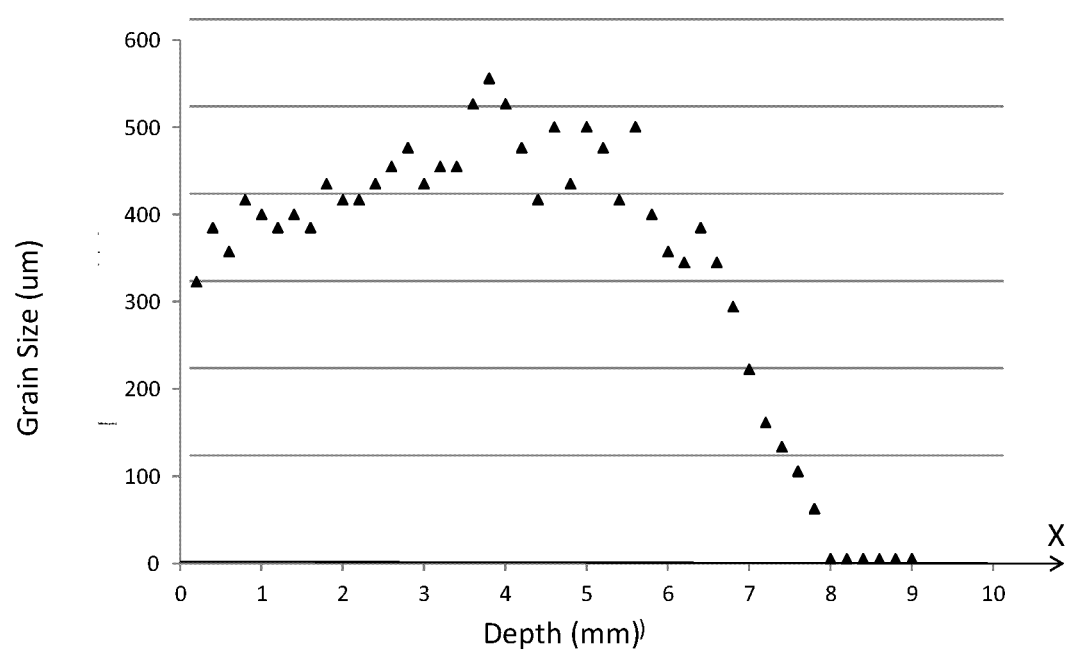
FIG. 6 illustrates a graph representing a grain size according to a depth from the external surface within the superalloy component of FIG. 5a, according to one embodiment.

FIG. 6 presents a graph indicating microstructural grain sizes at various depths of the microstructural composition 500 of FIG. 5a. At the periphery region 108 (i.e. between approximately 0 mm and 6.5 mm of depth), the microstructural grain size ranges from approximately 300 µm to 550 µm, whereas at the core region 110 (i.e. depth of approximately 8 mm and greater), the microstructural grain size measures 5 µm. As shown, the coarse metallurgical grains do not initially decrease with depth. Rather, the course metallurgical grains may increase or remain constant in size to a depth of about 4 mm before decreasing beyond that depth. The microstructural grain size ranging from approximately 300 µm to 550 µm provides adequate creep resistance properties for aeronautical applications and the microstructural grain size of approximately 5 µm provides adequate vibration-fatigue resistance properties for aeronautical applications. In the present case the transition between the large grained region and the small grained region spreads over 1.5 mm.

In other applications, a component 100 made from an alloy material such as a stainless steel material may require good corrosion resistance properties at its periphery but may require good tension resistance and oligocyclic fatigue resistance or low cycle fatigue (LCF) resistance at its core. Uniformly treated alloys cannot provide both good corrosion resistance properties as well as good tractional and LCF resistance. A fine grain microstructure provides adequate tractional and LCF resistance and a coarse grain microstructure provides adequate corrosion resistance. Therefore the induction heating and cooling method described above can also be applied to such alloys being used in various other areas of application without departing from the scope of the present method.

Figure 7:
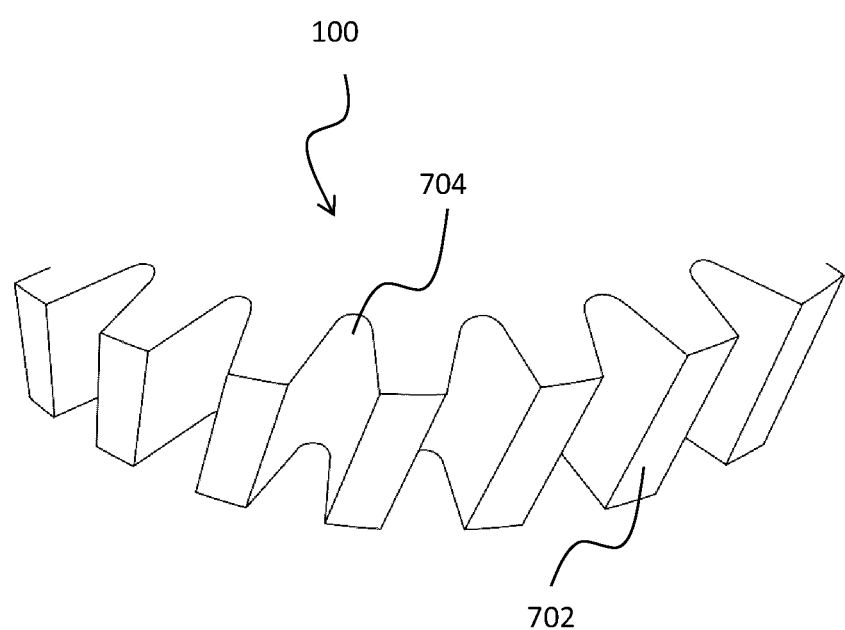
FIG. 7 is a partial perspective view of an irregular geometry defining a complex peripheral region to be heat treated, according to one embodiment.

Moreover depending on the area of application, the component 100 to be treated may have an irregular shape, such as the component 100 of FIG. 7. The component 100 defines an irregular periphery with gear-like teeth 702 and indentations 704. For such an irregular shaped component 100, the method can control the regions in which the grain coarsening will take place. The size and position of these regions as well as the targeted grain sizes can vary from one application to the next. Using the various parameters exposed herein, this technology allows one to rethink the way components 100 exposed to antinomic situations such as fatigue and creep can be designed and this opens up the field of grain size engineering.

Figure 8:
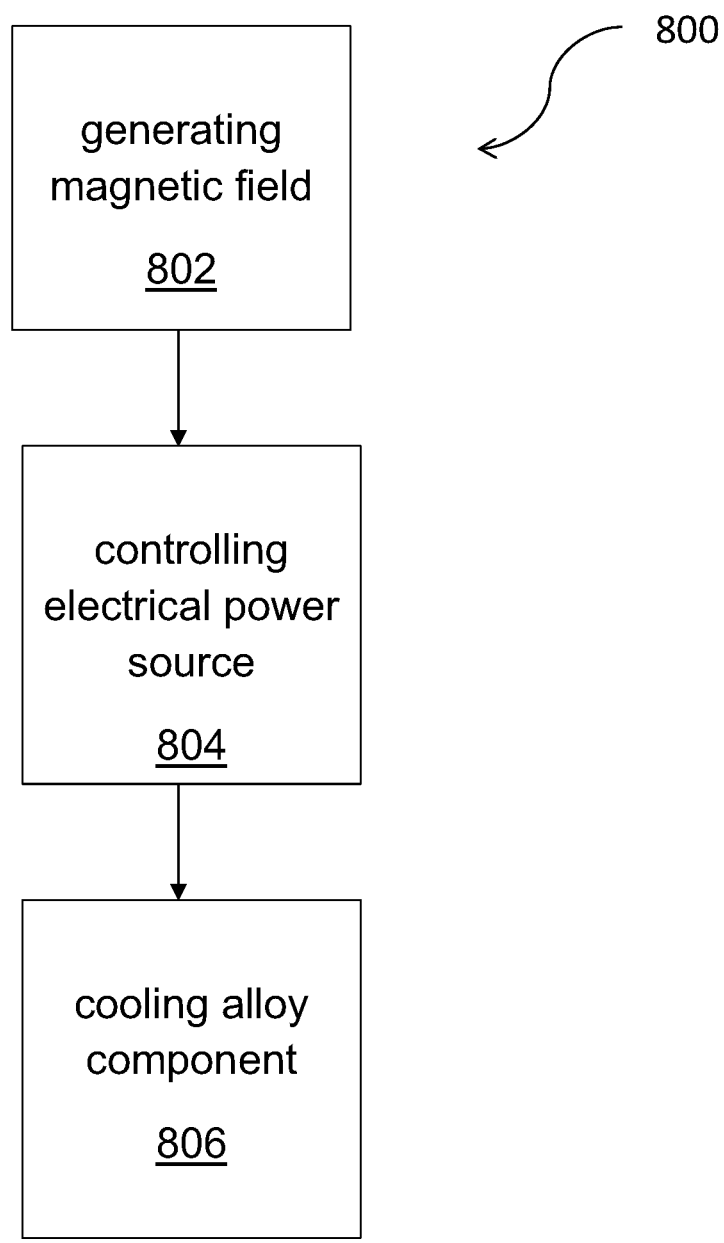
FIG. 8 is a block diagram illustrating a grain coarsening treatment method, according to one embodiment.

According to yet another aspect of the present and as presented in FIG. 8, there is a grain coarsening treatment method 800 for treating an alloy component having a fine metallurgical grain microstructure. The alloy component is composed of a peripheral region 108 and a core region 110, as concurrently presented in FIG. 1. The method 800 includes generating a magnetic field 802 around the alloy component with a field inductor 102 connected to an electrical power source 104 in order to induce an Eddy current and dissipate heat by joule effect within the alloy component. The method 800 further includes controlling the electrical power source 804 in order to promote microstructural growth of coarse metallurgical grains at the peripheral region 108 and maintaining the fine metallurgical grain at the core region 110. The method 800 also includes cooling the alloy component 806 in order to maintain the coarse metallurgical grains and prevent precipitation at the peripheral region 108 of the alloy component.

Figure 9:
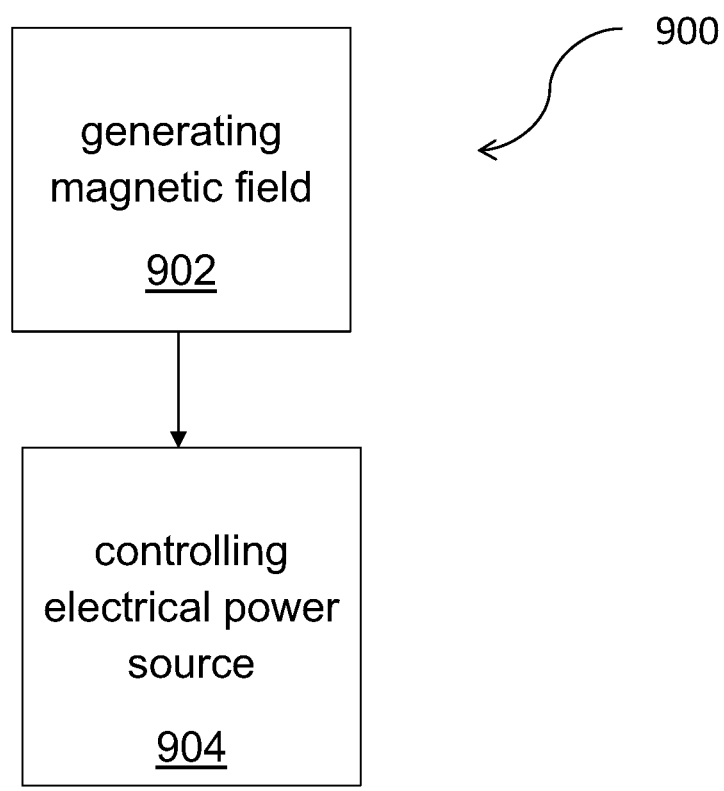
FIG. 9 is a block diagram illustrating a precipitation hardening treatment method, according to one embodiment.

According to yet another aspect of the present and as presented in FIG. 9, there is a precipitation hardening treatment method 900 for treating an alloy component having a peripheral region 108 and a core region 110, as concurrently presented in FIG. 1. The alloy component is composed of a fine metallurgical grain microstructure at the core region 110 and a coarse metallurgical grain microstructure at the periphery region 108. The method 900 includes generating a magnetic field 902 around the alloy component with a field inductor 102 connected to an electrical power source 104 in order to induce an Eddy current and dissipate heat by joule effect within the alloy component. The method further includes controlling the electrical power source 904, in order to controllably form precipitates at the periphery region 108 and achieve a desired hardness therein while maintaining the coarse metallurgical grain microstructure at the periphery region 108 and maintaining the fine metallurgical grain at the core region 110.

It shall be understood that the various alternatives described above for the grain coarsening treatment method 800 of FIG. 8 can be applied to the precipitation hardening treatment method 900 of FIG. 9, if suitable and desirable.

The various alternatives described above for generating a magnetic field 802 during the grain coarsening treatment 800 of FIG. 8 can suitably be applied to generating a magnetic field 902 during the precipitation hardening treatment 900 of FIG. 9, if desirable. For instance, the generating a magnetic field 902 can include generating a sequential electromagnetic field in order to cyclically dissipate heat by joule effect within the alloy component. Also, the alloy component can be rotated while generating the magnetic field 902 in order to provide a homogenous magnetic field The various alternatives described above for controlling the electrical power source 804 during the grain coarsening treatment 800 of FIG. 8 can suitably be applied to controlling the electrical power source 904 during the precipitation hardening treatment 900 of FIG. 9. For instance, the controlling the electrical power source 904 can include controlling a plurality of simultaneous frequencies and treatment duration according to the desired heat penetration and a geometry of the alloy component.

Figure 10:
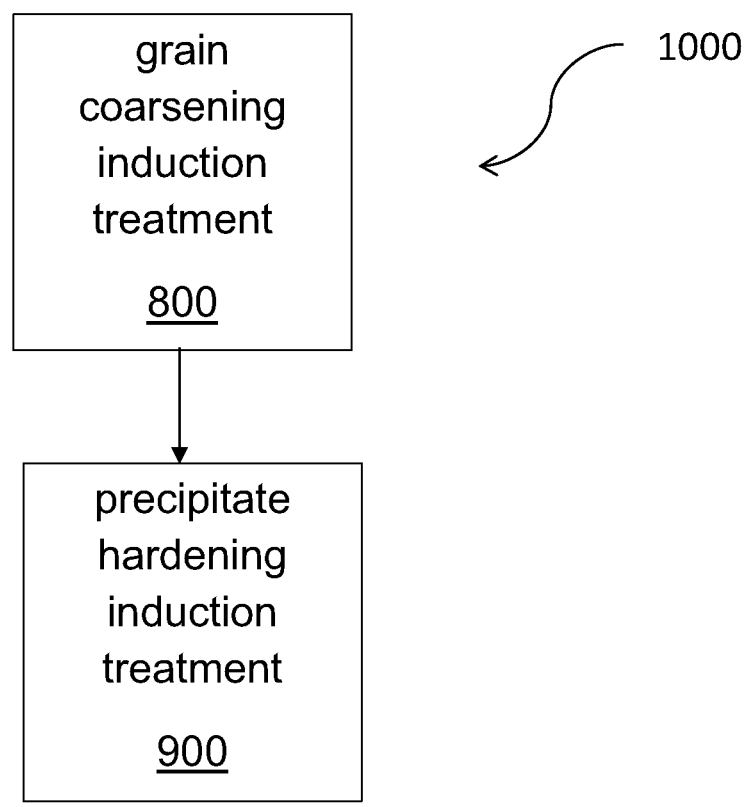
FIG. 10 is a block diagram illustrating a method of treating an alloy component having the grain coarsening treatment method of FIG. 8 followed by the precipitation hardening treatment method of FIG. 9, according to one embodiment.

According to a further aspect of the present and as presented in FIG. 10, an alloy component treatment method 1000 includes the grain coarsening induction treatment method 800 followed by the precipitation hardening induction treatment method 900.

The peripheral region 108 and the core region 110 of the component 100 have been used to illustrate one embodiment of the component 104. It shall however be understood that depending on the area of application and the geometry of the component, the peripheral region 108 and the core region 110 may be interchanged. In addition, the peripheral region 108 and the core region 110 may be concentric or non-concentric. Also, the peripheral region 108 and the core region 110 may have various forms, shapes and sizes, depending on the geometry of the component 100 the peripheral region 108 may be in a lateral arrangement with respect to the core region 110.

The invention claimed is:

1. A method of treating an alloy component having a peripheral region and a core region, the alloy component initially having a fine metallurgical grain microstructure with a grain size less than 20 µm, the method comprising:

selecting a depth of penetration greater than 4 mm and determining a corresponding magnetic field frequency that provides penetration of induced eddy currents up to the selected depth of penetration;

generating a magnetic field at the determined frequency around the alloy component with an inductor connected to an electrical power source, to induce the eddy currents within the alloy component according to the selected depth of penetration and dissipate heat by Joule effect within the alloy component; and controlling the electrical power source while generating the magnetic field to provide the magnetic field at the determined frequency for a duration of application of the magnetic field, to directly induce the eddy currents within the alloy component according to the selected depth of penetration so as to produce a heat level above a precipitate solvus temperature within the alloy component at a range of depth in accordance with the selected depth of penetration to form coarse metallurgical grains of a grain size greater than 20 µm at the peripheral region in which said coarse metallurgical grains have a grain size that initially either remains constant or increases with depth in said peripheral region and maintain the fine metallurgical grain at the core region; and cooling the alloy component to maintain the coarse metallurgical grains and prevent formation of precipitates at the peripheral region of the alloy component.

2. The method of claim 1, wherein controlling the electrical power source comprises controlling a frequency of the electrical power source according to a specific heat penetration that is greater than 4 mm and a geometry of the alloy component.

3. The method of claim 1 wherein controlling the electrical power source comprises controlling a plurality of simultaneous frequencies and treatment duration according to a specific heat penetration that is greater than 4 mm and a geometry of the alloy component.

4. The method of claim 1 wherein the magnetic field generated is a sequential electromagnetic field to cyclically dissipate heat by Joule effect within the alloy component.

5. The method of claim 1 further comprising rotating the alloy component while generating the magnetic field to provide a homogenous magnetic field in the alloy component.

6. The method of claim 1 further comprising displacing the alloy component with respect to the magnetic field along a path defined according to a geometry of the alloy component by controlling a distance between the inductor and the alloy component to provide a homogeneous magnetic field in the alloy component.

7. The method of claim 1 further comprising producing temperature gradients within the alloy component during the generating a magnetic field by providing heat dissipation from a surface of the alloy component.

8. The method of claim 1 further comprising producing temperature gradients within the alloy component during the cooling by generating a fluid movement on a surface of the alloy component.

9. The method of claim 1 wherein the fine metallurgical grain at the core region is adapted to provide a specific fatigue resistance.

10. The method of claim 1 wherein the coarse metallurgical grains at the peripheral region is adapted to provide a specific creep resistance.

11. The method of claim 1, wherein said coarse metallurgical grains have a grain size that initially increases with depth in said peripheral region.

12. A method of manufacturing a part comprising an alloy component, the method comprising:

forging, casting or producing an untreated alloy to provide an alloy component having a fine microstructural grain; and treating the alloy component by the method as defined in claim 1 to provide a specific creep resistance at the peripheral region and a specific fatigue resistance at the core region.

13. A method of treating an alloy component having a peripheral region and a core region, the alloy component having a fine metallurgical grain microstructure with a grain size less than 20 µm at the core region and a coarse metallurgical grain microstructure at the peripheral region with a grain size greater than 20 µm, the method comprising:

selecting a depth of penetration greater than 4 mm and determining a corresponding magnetic field frequency that provides penetration of induced eddy currents up to the selected depth of penetration;

generating a magnetic field at the determined frequency around the alloy component with a field inductor connected to an electrical power source to induce the eddy currents within the alloy component according to the selected depth of penetration and dissipate heat by Joule effect within the alloy component; and controlling the electrical power source while generating the magnetic field to provide the magnetic field at the determined frequency to directly induce the eddy currents within the alloy component according to the selected depth of penetration so as to produce a specific heat level within the alloy component at a specific range of depth in accordance with the selected depth of penetration to controllably form precipitates at the periphery region and achieve a specific hardness therein while maintaining the coarse metallurgical grain microstructure at the peripheral region in which said coarse metallurgical grains have a grain size that initially either remains constant or increases with depth in said peripheral region and maintaining the fine metallurgical grain at the core region.

14. The method of claim 13 wherein controlling the electrical power source comprises controlling an electrical current according to the selected depth of penetration and the determined magnetic field frequency, a geometry of the alloy component and a treatment duration.

15. The method of claim 13 wherein controlling the electrical power source comprises controlling at least one frequency according to a specific heat penetration that is greater than 4 mm and a geometry of the alloy component.

16. The method of claim 13 wherein the magnetic field is generated during a period of time according to the controlling of the electrical power source and a distance between the inductor and the alloy component's geometry.

17. The method of claim 13 further comprising rotating the alloy component while generating the magnetic field to promote heat dissipation by convection for maintaining a specific temperature at a surface portion of the alloy component.

18. The method of claim 13 further comprising displacing the magnetic field along a path defined according to a geometry of the alloy component, by controlling a distance between the inductor and the alloy component.

19. The method of claim 13, wherein said coarse metallurgical grains have a grain size that initially increases with depth in said peripheral region.

* * * * *